United States Patent
Gedliczka et al.

(10) Patent No.: US 11,269,848 B2
(45) Date of Patent: Mar. 8, 2022

(54) PREVENTING UNNECESSARY UPLOAD

(71) Applicant: International Business Machines Corporation, Armonk, NY (US)

(72) Inventors: Tymoteusz Gedliczka, Cracow (PL); Tomasz Kania, Tarnow (PL); Krzysztof Pitula, Tarnow (PL); Szymon Brandys, Cracow (PL); Maciej Madej, Cracow (PL); Piotr Grzywna, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/813,785

(22) Filed: Mar. 10, 2020

(65) Prior Publication Data

US 2021/0286797 A1 Sep. 16, 2021

(51) Int. Cl.
| | | |
|---|---|---|
| *G06F 16/00* | (2019.01) | |
| *G06F 16/23* | (2019.01) | |
| *G06F 16/25* | (2019.01) | |
| *G06F 16/22* | (2019.01) | |
| *G06F 16/215* | (2019.01) | |

(52) U.S. Cl.
CPC ........ *G06F 16/2358* (2019.01); *G06F 16/215* (2019.01); *G06F 16/2282* (2019.01); *G06F 16/2365* (2019.01); *G06F 16/258* (2019.01)

(58) Field of Classification Search
None
See application file for complete search history.

(56) References Cited

U.S. PATENT DOCUMENTS

| | | |
|---|---|---|
| 8,903,838 B2 | 12/2014 | Hunter et al. |
| 2005/0187959 A1* | 8/2005 | Jung ............... H04L 67/142 |
| 2016/0063025 A1* | 3/2016 | Lee ................. G06F 16/2379 707/613 |
| 2016/0092557 A1 | 3/2016 | Stojanovic et al. |
| 2016/0162507 A1 | 6/2016 | Gupta et al. |
| 2018/0074786 A1 | 3/2018 | Oberbreckling et al. |

OTHER PUBLICATIONS

"How can I prevent duplicate file uploads?", Github, danielursuu opened this issue, Aug. 28, 2017, 5 pages, <https://github.com/fossology/fossology/issues/894>.

* cited by examiner

*Primary Examiner* — Bai D Vu
(74) *Attorney, Agent, or Firm* — Erika R. DeCosty; Isaac Gooshaw

(57) ABSTRACT

A computer-implemented method that can prevent an upload of a data set upon detection of a modification of the data set. The method includes storing a first portion of a file in a buffer while being in a receiving mode. Upon determining that applying one of a predefined transformation performed to the first portion of an existing data set will result in reproducing a content of the buffer: generating a transformation notification signal; and upon receiving a stop message, stopping the receiving mode which results in using the existing file on the server.

16 Claims, 6 Drawing Sheets

PREVENTING UNNECESSARY UPLOAD

BACKGROUND

The invention relates generally to uploading data, and more specifically, to controlling an upload of a data set upon detection of a modification of that data set.

Data analytics is often leveraged in enterprise computing. Further, the amount of data used for decision-making in companies is ever-growing. With this, the development of more and more sophisticated data analysis methods—now often denoted as data science—are emerging. Additionally, other topics like a big data and machine-learning (ML), a subcategory of artificial intelligence (AI), also gain ground in both the scientific community as well as in companies of all sizes. These technologies, and many others, often rely on the ability to quickly move large amounts of data to be analyzed. Faster data transfer rates may reduce the amount of downtime incurred while waiting for data to transfer as well as reduce the overall time required to complete an analysis.

SUMMARY

One aspect of the invention provides a computer implemented method. The computer implemented method comprising: storing a first portion of a file in a buffer while a receiving mode is active; determining that applying a predefined transformation on a first portion of an existing data set results in a generation of a data set that corresponds to the first portion of the file; generating a transformation notification signal; and upon receiving a stop message, stopping the receiving mode.

Another aspect of the invention provides a computer program product embodied as program instructions stored on a computer readable storage medium. The program instructions comprising instructions to cause a computing device to perform a computer implemented method, the computer implemented method comprising: storing a first portion of a file in a buffer while a receiving mode is active; determining that applying a predefined transformation on a first portion of an existing data set results in a generation of a data set that corresponds to the first portion of the file; generating a transformation notification signal; and upon receiving a stop message, stopping the receiving mode.

Another aspect of the invention provides a computer system. The computer system including program instructions stored on a computer readable storage medium that, when executed by the computer system, causes the computer system to perform a computer implemented method, the computer implemented method comprising: storing a first portion of a file in a buffer while a receiving mode is active; determining that applying a predefined transformation on a first portion of an existing data set results in a generation of a data set that corresponds to the first portion of the file; generating a transformation notification signal; and upon receiving a stop message, stopping the receiving mode.

Still yet, any of the components of the present invention could be deployed, managed, serviced, etc., by a service provider who offers to implement management of data upload in a computer system. Embodiments of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings. It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
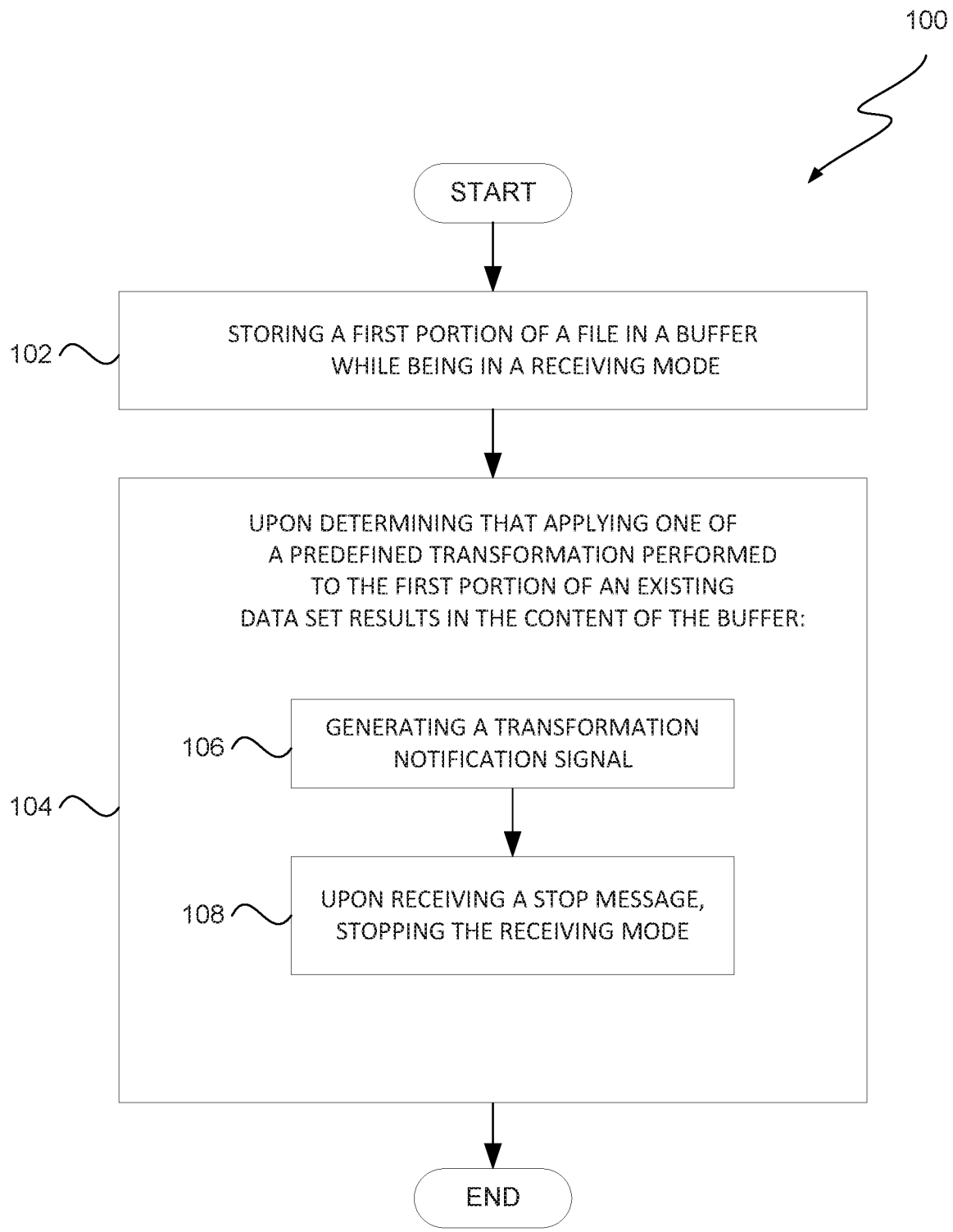

Preferred embodiments of the invention will be described, by way of example only, and with reference to the following drawings:

FIG. 1 shows a block diagram of an embodiment of a computer-implemented method for controlling an upload of a data set upon detection of a modification of the data set.

Figure 2:
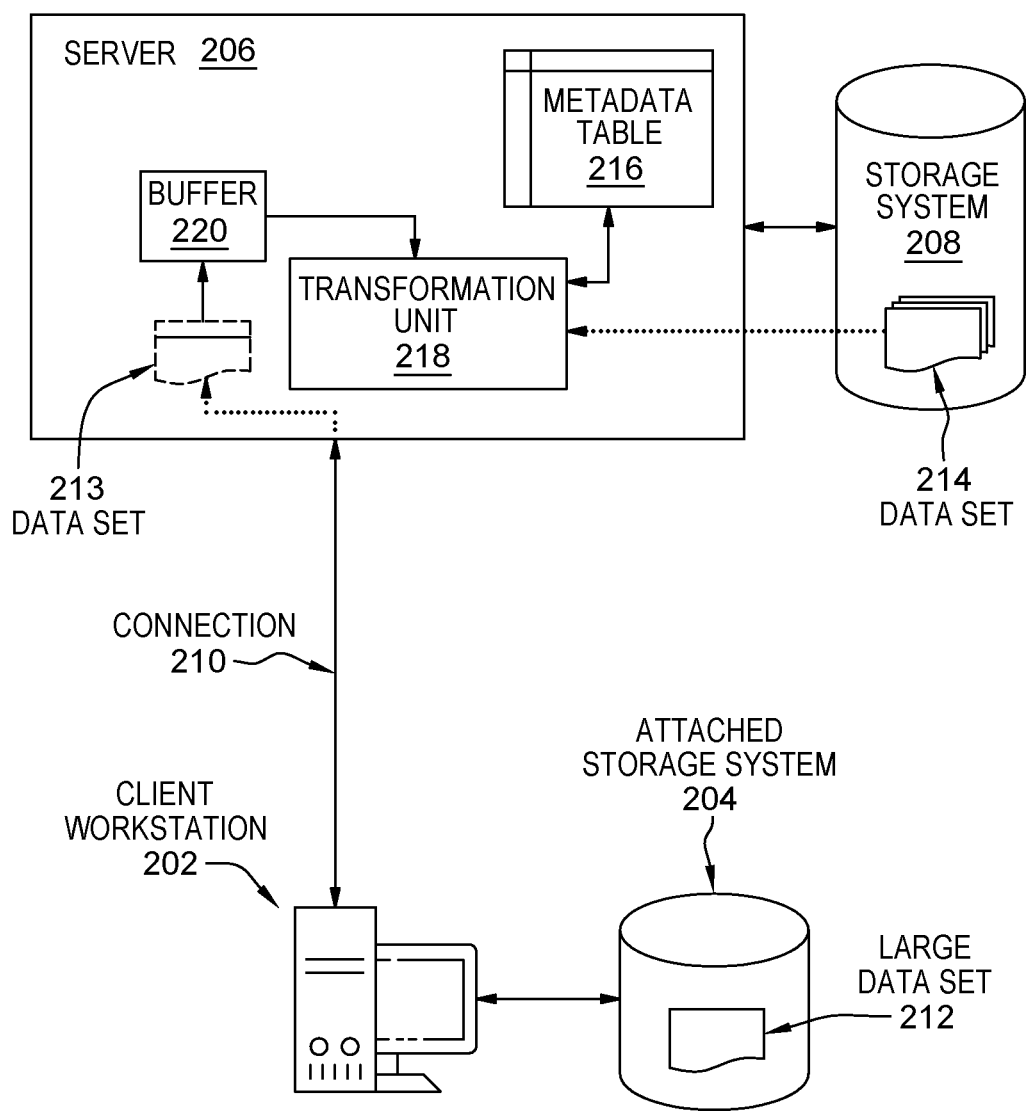

FIG. 2 shows a block diagram of an embodiment of components leveraged by one embodiment of a computer-implemented method for controlling an upload of a data set upon detection of a modification of the data set.

Figure 3:
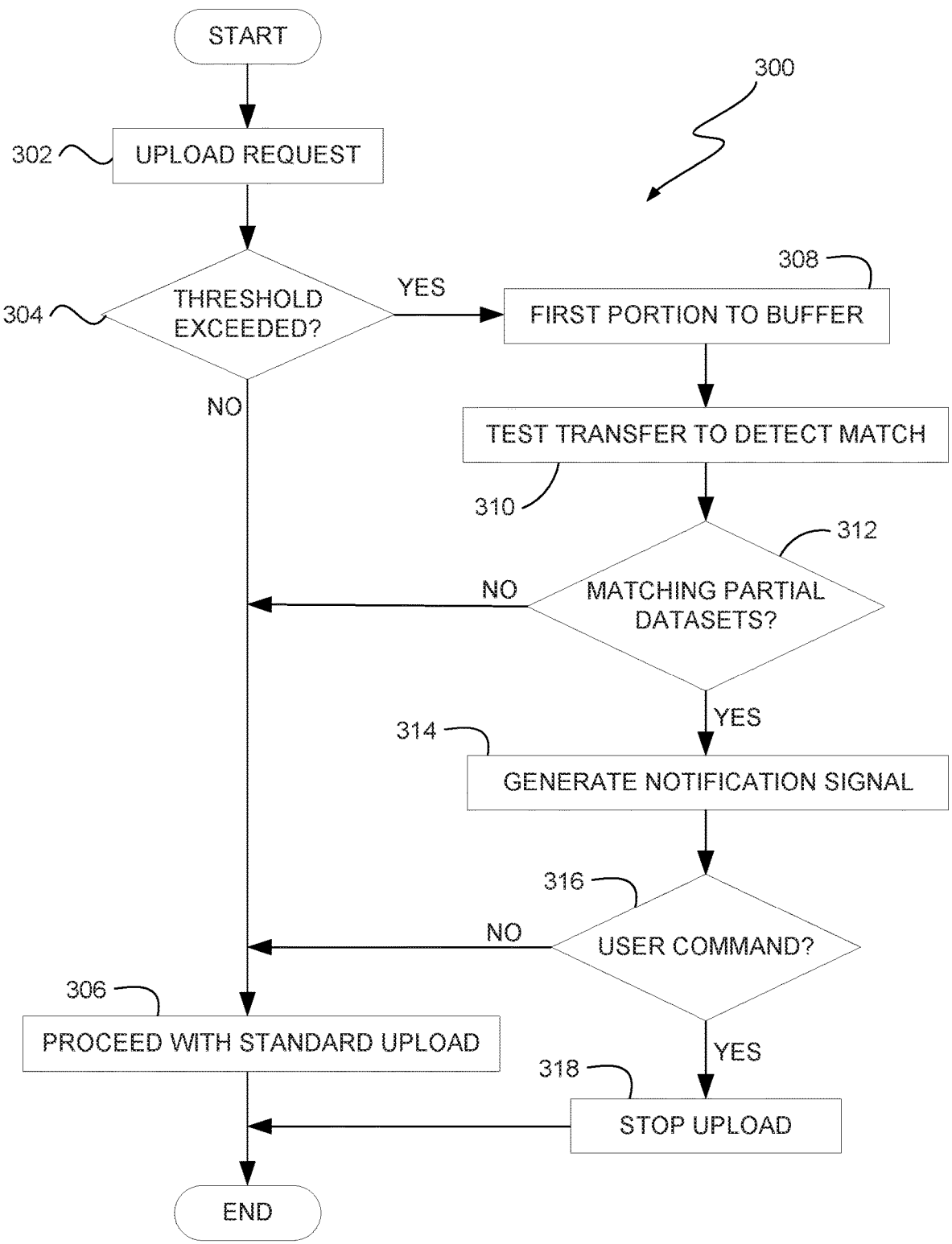
Figure 4A:
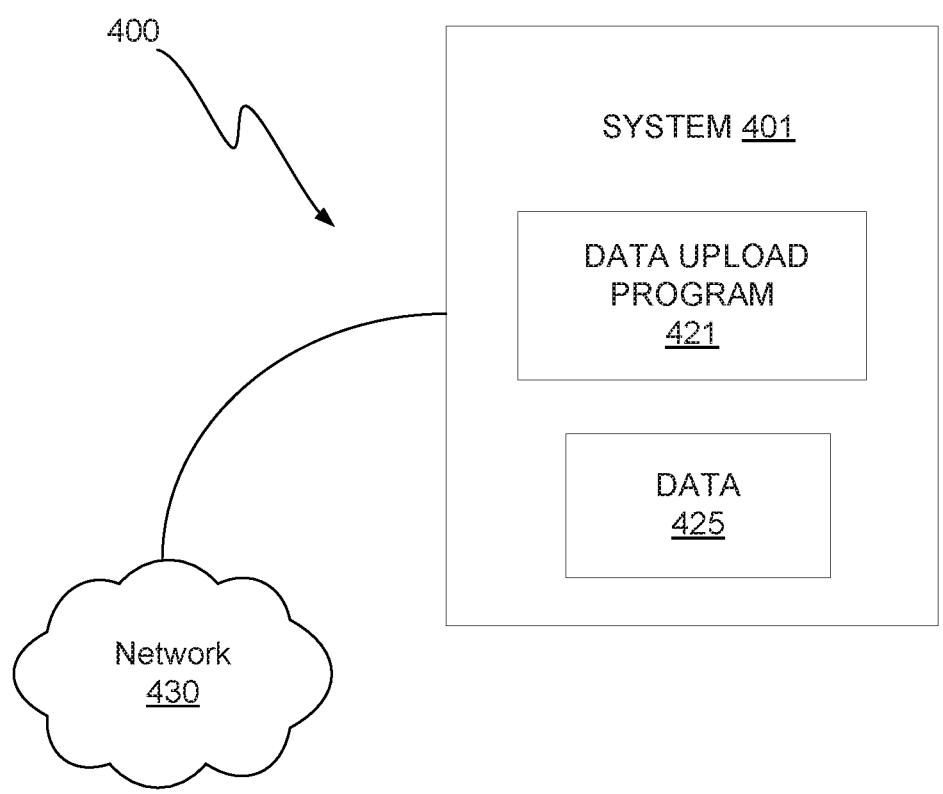

FIG. 3 shows a flowchart that illustrates operational processes of one embodiment of a computer-implemented method for controlling an upload of a data set upon detection of a modification of the data set, executing on a computing device within the environment of FIG. 4A, in accordance with an exemplary embodiment of the present invention.

FIG. 4A is a functional block diagram illustrating a data transfer environment, in accordance with an exemplary embodiment of the present invention.

Figure 4B:
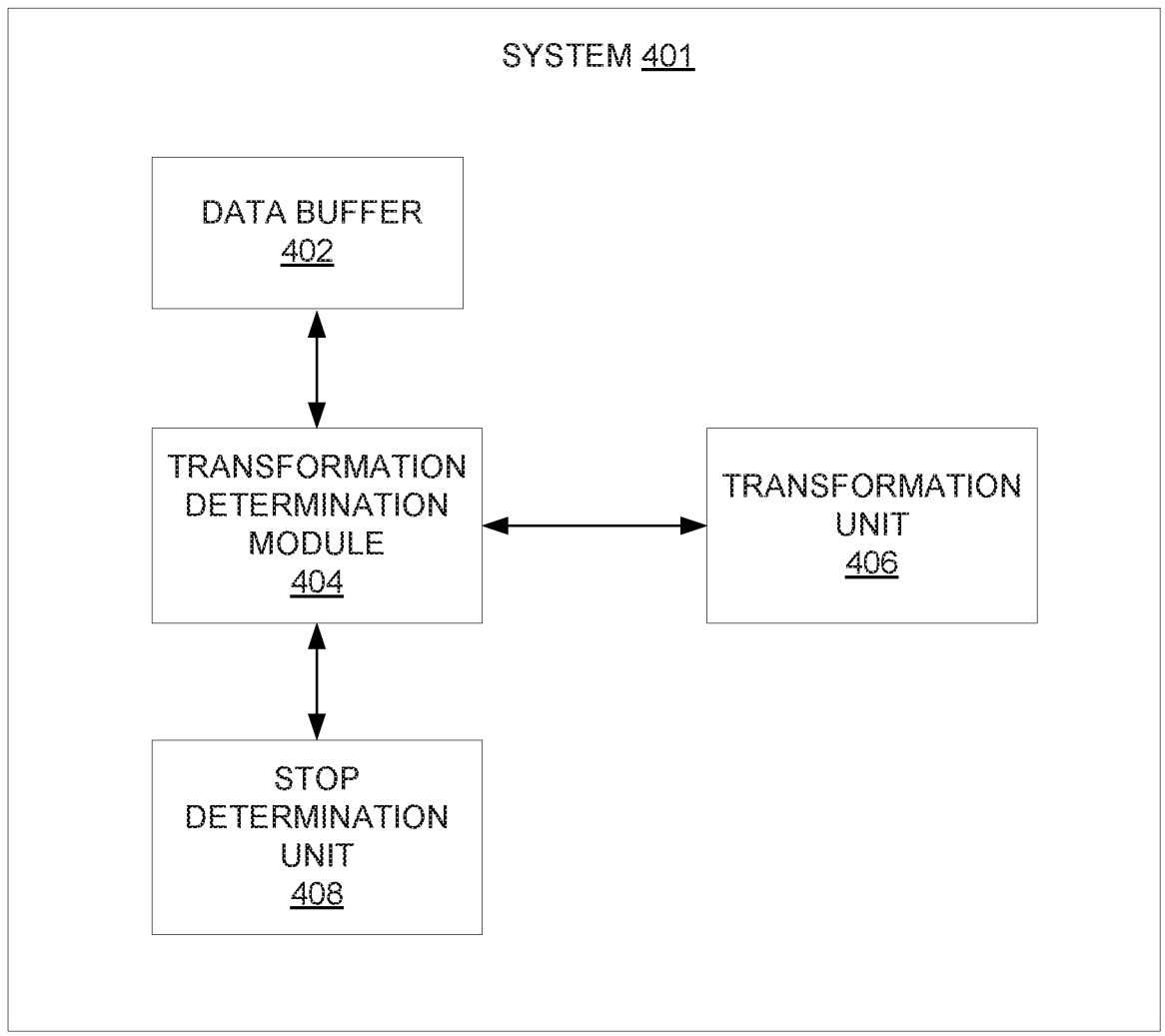

FIG. 4B shows an embodiment of an upload prevention system for controlling an upload of a data set upon detection of a modification of the data set.

Figure 5:
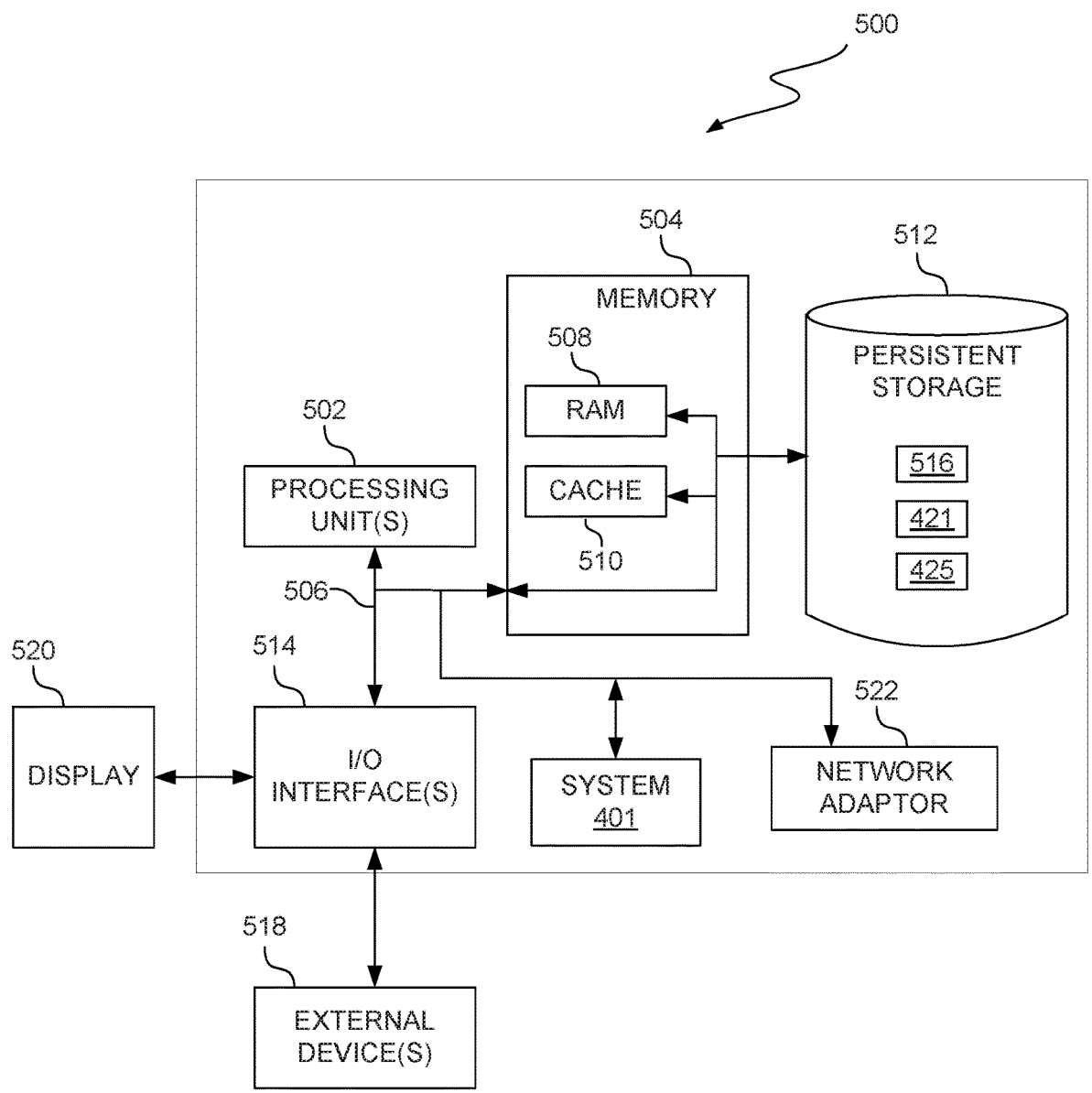

FIG. 5 depicts a block diagram of components of a computing device executing the computer-implemented method for controlling an upload of a data set upon detection of a modification of the data set according to FIG. 4B, in accordance with an exemplary embodiment of the present invention.

DETAILED DESCRIPTION

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In general, embodiments recognize that large amounts of data may need to be moved between various computing systems. In some scenarios, moving data from one data storage location to another can consume more energy than processing the data. In general, uploading large data sets consumes resources, like network bandwidth, storage, and time of a user waiting on completion of an upload from one computer system or storage system—e.g., a client computing workstation—to a server for further processing. In some scenarios, users may elect to transform data in a given file locally before uploading it—eventually with modifications—to a server for more high-performance computing and analysis. As such, repeatedly uploading the same files or data sets again and again may yield a waste of the aforementioned resources.

Thus, an objective of this disclosure may encompass avoiding or reducing waste of computing and network resources when making data available on a server. Some embodiments provide a reduction in the amount of time that would otherwise be wasted while waiting for large data sets to be uploaded from one computer system to another computer system.

The present invention will now be described in detail with reference to the Figures. In the context of this description, the following conventions, terms and/or expressions may be used:

The term 'data set' may denote a collection of data of any form. In general, it may be a data file, or in short, a file. It may comprise structured, unstructured or semi-structured data. The data may relate to any technical field, may it be image or video data or data from a data lake. Basically, the here proposed concept works for any kind of data.

The term 'first portion' may denote a predefined amount of data—e.g., measured in GB (GigaByte) or TB (TeraByte), eventually also in Petabyte—of the data set to be uploaded from one computing system to another. The predefined amount may be a predefined number of records or rows of the data set, or alternatively a predefined percentage of the uploading data set. Such data may also be defined in a set of metadata of the data set to be uploaded. Alternatively, the predefined amount of data may be defined in a configuration file of a system controlling the uploading process.

The term 'buffer' may denote a storage unit or an intermediate storage system, preferably of definable, i.e., variable size, adapted to store the first portion of the received data file. The data may be moved under the control of a processor (or another controller) in to the buffer.

The term 'receiving mode' may denote that data or the data set, or file, may be received in streaming mode via network on a server. When in receiving mode, the server may continuously receive data of a large data set in order to process it directly, find or supply a suitable transformation to chunks of the data set.

The term 'predefined transformation' may denote a transformation by which at least parts of the received data set are generable out of an already existing data file on the server. The suitability of a transformation may be tested on a first portion of the received file—for example, a first portion of the received file being stored in the buffer—and a corresponding portion of a resident file on the server.

The term 'transformation notification signal' may denote a signal or message indicative of the fact that a suitable transformation has been found among the predefined transformations which may convert—at least parts—of an already existing data set into a corresponding portion of the receiving data set.

The term 'stop message' may denote a signal instrumental for terminating the transmission process of the large data set from the uploading system to the receiving system.

The term 'progress message' may denote a signal indicative of the amount of data of the received data file that has been processed on the server with the predefined transformation. A related display icon may have the form of a bar graph.

The term 'difference message' may denote a signal indicative of a determined difference between the already existing data set on the server in its transformed form by the determined predefined transformation and the receiving data set.

In the following, a detailed description of the figures will be given. All instructions in the figures are schematic. Firstly, a block diagram of an embodiment of a computer-implemented method is provided that, when executed by a computing system, may prevent an upload of a data set upon detection of a modification of the data set. Afterwards, further embodiments, as well as embodiments of an upload prevention system for controlling an upload of a data set upon detection of a modification of the data set, will be described.

FIG. 1 shows a block diagram, 100, of a preferred embodiment of the computer-implemented method for controlling or otherwise controlling an upload of a data set upon detection of a modification of the data set. The method comprises storing, 102, a first portion, which may be of predefined length, e.g., a number of records, or data amount of a file in a buffer while the server is in a receiving mode. The upload may typically happen from a client system to a server system having more available computing resources, e.g., for data analysis and/or machine-learning processes.

The method 100 comprises further generating, 106, a transformation notification signal, e.g., from the server being in the receiving process of the uploading data set, upon determining that applying one of a predefined transformation performed to the first portion of an existing data set results in the content of the buffer, 104. Additionally, the method comprises stopping, 108, the receiving mode of the related server, i.e., the receiving the uploading data set, upon receiving a stop message. Hence, the transmission of the large data set from a client to the server is halted, i.e., a transmission halt mode is activated or is the transmission is terminated completely.

FIG. 2 shows a block diagram, 200, of elements involved in the proposed concept. One computing system, e.g., client workstation 202 (or another, e.g., smaller, server) with an attached storage system 204, may initiate a transfer of a large data set 212 via the (network) connection 210 to the server 206. The data transfer can be performed in a streaming process. A first portion of a data set 213 (indicated using dashed lines) of the not yet received large data set 212 is stored in buffer 220. A transformation unit 218 tries to determine one of a predefined transformation in order to match the content of the buffer 220 with one or more first portions, i.e., a data portion being positioned at the beginning of the received data set, of already existing data sets 214 stored on the storage system 208 which is attached or part of the server 206. The first portion may comprise, e.g., the first 1000 records of the large data set 212. However, depending on the problem at hand another amount of data may be chosen. This may be fine-tuned during a configuration process of the underlying system.

It may also be noted that the first portion may not only start with the first bit of the data set but may also start after a predefined initial portion of the data set. The first portion may start after, e.g., 1 kB (kiloByte). The initial portion may comprise e.g., meta data of the transmitted data set.

While the uploading continues via the connection 210 continues, and if a match has been determined between the transformed content of the buffer 220 and one of the already existing data sets 214 on the server, a transformation notification signal or message is being generated, e.g., by the transformation unit 218. This transformation notification signal can be transmitted to the client workstation 202 and a user may decide that for the continued transmission of the large data set 212 from storage system 204 is no longer necessary. Instead, a copy of the large data set 212 may be generated on the server out of one of the data sets 214 by applying the determined transformation.

Instead of the user taking action, it is also possible that the stop of the transmission could be initiated automatically after a certain percentage of the large data set 212 has been transmitted to the server 206 and if the determined transformation continues to be able to generate matching pairs of records between corresponding portions of the received large data set 212 and the one of the transformed data set 214. Therefore, it is useful that the transformation unit 218—on a continuous basis—generates an indication of the progress of the receiving of the large data set 212 on the server-side and the parallel success of the matching process. As an example, a message could be: "32% of the file is received and the initially determined transformation continues to be correct". In such a case, the transmission can be stopped in order to save resources. The file on the server can be used instead for the analysis (or other) process.

Additionally, initiated by the transformation unit, meta data table 216 may be stored separately. The metadata may comprise a checksum of the initial portion of the data set 213 (i.e., the portion initially stored in the buffer 220), a checksum of the large data set 212 and a checksum of a successfully identified or determined data set out of the plurality of data sets 214 which has once been transformed successfully, as well as an identifier of the determined transformation.

This information can be used before the matching process has been started. For example, the checksum of the large data set 212 can be sent together with a request for the data transfer from the client workstation 202 to the server 206. Based on the checksum and using the information of the meta data table 216, a transformation may be identified using this lookup table. Thus, the transmission doesn't even need to be started in order to generate a copy of the large data set 212 on the server using one of the already existing data sets 214 together with the transformation identified by the identifier.

FIG. 3 shows a flowchart that illustrates operational processes of one embodiment of a computer-implemented method for controlling an upload of a data set upon detection of a modification of the data set, executing on a computing device within the environment of FIG. 4A, in accordance with an exemplary embodiment of the present invention.

Flowchart 300 may be interpreted in the context of the elements discussed in FIG. 2. The process can be initiated by a receiving process, 302, in which an upload request is received by the server (see also FIG. 2, server 206). Then, a determination is made, in determination process 304, as to whether the request comprises information about a file larger than a predefined threshold value. If the request comprises a file size smaller than the aforementioned threshold, "No" branch of determination process 304, then the system proceeds with process 306 and executes a standard upload process.

If however, the file size (fs) is larger than the threshold value, "Yes" branch of determination process 304, then a first portion of the file being uploaded to the server is stored, in process 308, in the buffer (see also FIG. 2, buffer 220) of the server. Then, for each supported transformation type Ti it is determined, in process 310, whether there is an existing data set (Dk) that was sample-transformed in which Ti equals (or matches) the data on the buffer.

Hence, it is determined, in determination process 312, whether a match between an existing data set and the transformed data set exists. If that a match does not exist, "No" branch of determination process 312, then the process continues with the standard upload in process 306.

If, however, a match is found, "Yes" branch of determination process 312, then a notification signal is generated, in process 314, that indicates this discovery. In some embodiments and scenarios, the user may additionally be prompted to (i) confirm if the dedicated and identified transformation is the only difference and (ii) indicate whether the user agrees to abort the upload and have the detected transformation applied on the detected source data set directly on the server.

In decision process 316, a determination is made to confirm whether or not the user issued a command based in response to the notification signal. For example, a message from the client system to the server is verified and analyzed to identify user sourced commands that dictate which data upload procedures are to be used. If a user command is not identified, "No" branch of determination process 316, then the standard upload process continues in process 306. However, if a user command is identified, "Yes" branch of determination process 316, then the upload process is stopped, in process 318, and a target data set is created by transforming the identified existing data set with the identified transformation.

FIG. 4A is a functional block diagram illustrating a data transfer environment, generally designated 400, in accordance with an exemplary embodiment of the present invention. Data transfer environment 400 includes system 401 connected over network 430. System 401 includes data upload program 421 and data 425. As is understood, data 425 includes large data set 212 and data sets 214, and any other data that is required by data upload program 421 to function in accordance with various embodiments.

In various embodiments of the present invention, system 401 is a computing device that can be a standalone device, a server, a laptop computer, a tablet computer, a netbook computer, a personal computer (PC), or a desktop computer. In another embodiment, system 401 represents a computing system utilizing clustered computers and components to act as a single pool of seamless resources. In general, system 401 can be any computing device or a combination of devices with access to data upload program 421 and data 425 and is capable of executing data upload program 421. System 401 may include internal and external hardware components, as depicted and described in further detail with respect to FIG. 5.

In this exemplary embodiment, data upload program 421 and data 425 are stored on system 401. However, in other embodiments, program modules 516, data upload program 421, and data 425 may be stored externally and accessed through a communication network, such as network 430. In general, program modules 516 represents any programming that is used by one or more embodiments to carry out the functions of the computer implemented method as are described herein. Network 430 can be, for example, a local area network (LAN), a wide area network (WAN) such as the Internet, or a combination of the two, and may include wired, wireless, fiber optic or any other connection known in the art. In general, network 430 can be any combination of connections and protocols that will support communications between system 401 and program modules 516, data upload program 421, and data 425, in accordance with a desired embodiment of the present invention.

FIG. 4B shows an embodiment of an upload prevention system for controlling an upload of a data set upon detection of a modification of the data set. In general, FIG. 4B shows a block diagram of an embodiment of upload prevention system 401 that prevents an upload of a data set upon detection of a modification of the data set. The system includes a data buffer 402. For example, a buffer or intermediate storage unit implemented in hardware that is adapted for storing a first portion of a file while being in a receiving mode. The system includes a transformation determination module 404, which may be implemented in hardware, that generates a transformation notification signal, if it is determined that applying one of a predefined transformation performed to the first portion of an existing data set results in the content of the buffer. The transformation can also be performed by a dedicated, e.g., hardware implemented, transformation unit 406.

Furthermore, an upload prevention system, e.g., system 401, may include a stop determination unit 408, e.g., implemented in hardware, that is adapted for stopping the receiving mode if it is determined that a stop upload message is received. The mentioned units and modules are interacting with each other—e.g., by interchanging electrical signals— as indicted by the double arrows. Further, the activity of the modules and units included in FIG. 4B may be implemented in software, hardware, or a combination thereof, in accordance with a given embodiment.

FIG. 5 depicts a block diagram, 500, of components of system 401, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purposes or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing unit(s) 502, a memory 504, and a communications fabric 506 that couple various system components including memory 504 to processing unit(s) 502. Communications fabric 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to communications fabric 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interface(s) 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via communications fabric 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the upload prevention system 401 for controlling an upload of a data set upon detection of a modification of the data set can be attached to communications fabric 506.

As is shown, system 401 includes communications fabric 506, which provides communications between processing unit(s) 502, memory 504, persistent storage 512, network adaptor 522, and input/output (I/O) interface(s) 514. Communications fabric 506 can be implemented with any architecture designed for passing data and/or control information between processors (such as microprocessors, communications and network processors, etc.), system memory, peripheral devices, and any other hardware components within a system. For example, communications fabric 506 can be implemented with one or more buses.

Memory 504 and persistent storage 512 are computer-readable storage media. In this embodiment, memory 504 includes random access memory (RAM) 508 and cache memory 510. In general, memory 504 can include any suitable volatile or non-volatile computer-readable storage media.

In one embodiment, program modules 516, data upload program 421, and data 425 are stored in persistent storage 512 for execution and/or access by one or more of the respective computer processors, for example, processing unit(s) 502, via one or more memories of memory 504. In this embodiment, persistent storage 512 includes a magnetic hard disk drive. Alternatively, or in addition to a magnetic hard disk drive, persistent storage 512 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 512 may also be removable. For example, a removable hard drive may be used for persistent storage 512. Other examples include optical and magnetic disks, thumb drives, and smart cards that are inserted into a drive for transfer onto another computer-readable storage medium that is also part of persistent storage 512.

Network adaptor 522, in these examples, provides for communications with other data processing systems or devices, including resources of network 430. In these examples, network adaptor 522 includes one or more network interface cards. Network adaptor 522 may provide communications through the use of either or both physical and wireless communications links. Program modules 516, data upload program 421, and data 425 may be downloaded to persistent storage 512 through network adaptor 522.

I/O interface(s) 514 allows for input and output of data with other devices that may be connected to system 401. For example, I/O interface(s) 514 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., program modules 516, data upload program 421, and data 425, can be stored on such portable computer-readable storage media and can be loaded onto persistent storage 512 via I/O interface(s) 514. I/O interface(s) 514 also connect to a display 520.

Display 520 provides a mechanism to display data to a user and may be, for example, a computer monitor, or a television screen.

In one embodiment, a computer-implemented method is provided for controlling an upload of a data set upon detection of a modification of the data set. The method includes: storing a first portion of a file in a buffer while a receiving mode is active; determining that applying a predefined transformation on a first portion of an existing data set results in a generation of a data set that corresponds to the first portion of the file; generating a transformation notification signal; and upon receiving a stop message, stopping the receiving mode.

In one embodiment, the computer-implemented method includes determining that an execution of the predefined transformation will yield a content of the buffer; and applying the predefined transformation to all of the existing data set.

In one embodiment, the computer-implemented method includes generating a progress message that indicates a status of the transformation that is being applied to the entire existing data set; and upon determining that an inconsistency exists between a second portion of the file and a portion of the transformed existing file while being in the receiving mode, generating a difference message that indicates the inconsistency.

In one embodiment, the predefined transformation comprises executing at least one action selected out of a group of possible actions that include: a removal of a column, a renaming of a column, a reordering of columns, an insertion of a column, and a removal of an empty row.

In one embodiment, the first portion of the file is a predefined number of rows, a predefined volume of data, or a predefined number of records.

In one embodiment, the computer-implemented method includes receiving a file upload request that includes meta data about a given file to be uploaded; and using the meta data to identify a candidate existing file that, when transformed, may yield at least a portion of the given file to be uploaded.

In one embodiment, the computer-implemented method includes, before starting receiving of the data set, storing meta data of one or both of (i) a first portion of a complete file, wherein the first portion is stored in the buffer, and (ii) a related existing file generable by a transformation or an applied transformation.

In one embodiment, the computer-implemented method includes, before receiving the stop message, continuing to receive the file of which the first portion of the file is already stored in the buffer; continuing the transformation of the existing file; and generating progress information about a progress of the transformation of the existing data set.

In one embodiment, the computer-implemented method includes terminating the receiving mode automatically in response to a determination that a stop message was not received within a time period and that applying the one of a predefined transformation to a predetermined percentage of a second portion of the existing file continues to result in a set of data that corresponds to a porting of the existing file.

In one embodiment, the computer-implemented method includes, responsive to receiving the stop message, using a transformed existing file for an additional operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain term(s) used herein may be subject to trademark rights in various jurisdictions throughout the world and are used here only in reference to the products or services properly denominated by the marks to the extent that such trademark rights may exist.

It is apparent that there has been provided approaches for controlling the upload of data. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method, the computer-implemented method comprising:
uploading, by one or more processors, a first portion of a file from a client device to a buffer of a server device while a receiving mode of the buffer is active, wherein the first portion of the file is a predefined number of rows, a predefined volume of data, or a predefined number of records;
generating, by one or more processors, a transformation notification signal based, at least in part, on determining that applying a predefined transformation on a first portion of an existing data set stored on the server device results in a generation of a data set that corresponds to the first portion of the file stored in the buffer; and
terminating, by one or more processors, an upload of a second portion of the file from the client device to the buffer of the server device based, at least in part, on receiving a stop message.

2. The computer-implemented method according to claim 1, the computer-implemented method comprising:
determining that an execution of the predefined transformation will yield a content of the buffer; and
applying the predefined transformation to all of the existing data set.

3. The computer-implemented method according to claim 2, the computer-implemented method comprising one or both of:
generating a progress message that indicates a status of the transformation that is being applied to the entire existing data set; and
upon determining that an inconsistency exists between the second portion of the file being uploaded to the buffer of the server device and a portion of a transformed existing file while being in the receiving mode, generating a difference message that indicates the inconsistency.

4. The computer-implemented method according to claim 1, wherein the predefined transformation comprises executing at least one action selected out of a group of possible actions that include: a removal of a column, a renaming of a column, a reordering of columns, an insertion of a column, and a removal of an empty row.

5. The computer-implemented method according to claim 1, the computer-implemented method comprising:
receiving a file upload request that includes meta data about a given file to be uploaded; and
using the meta data to identify a candidate existing file that, when transformed, may yield at least a portion of the given file to be uploaded.

6. The computer-implemented method according to claim 1, the computer-implemented method comprising:

before reception of the data set, storing meta data of one or both of (i) a first portion of a complete file, wherein the first portion is stored in the buffer, and (ii) a related existing file generable by a transformation or an applied transformation.

7. The computer-implemented method according to claim 1, the computer-implemented method comprising:
terminating, by the one or more processors, the receiving mode of the buffer automatically in response to a determination that the stop message was not received by the client device within a predetermined time period and that applying the predefined transformation to a predetermined percentage of a second portion of the existing data set stored on the server device continues to result in a set of data that corresponds to the second portion of the file already uploaded to the buffer of the server device.

8. The computer-implemented method according to claim 1, the computer-implemented method comprising:
responsive to sending, by one or more processors, the stop message to the client device, using a transformed existing file for an additional operation.

9. A computer program product, the computer program product comprising a computer readable storage medium having program instructions embodied therewith, the program instructions executable by a device to cause the device to perform a computer-implemented method comprising:
uploading, by one or more processors, a first portion of a file from a client device to a buffer of a server device while a receiving mode of the buffer is active, wherein the first portion of the file is a predefined number of rows, a predefined volume of data, or a predefined number of records;
generating, by one or more processors, a transformation notification signal based, at least in part, on determining that applying a predefined transformation on a first portion of an existing data set stored on the server device results in a generation of a data set that corresponds to the first portion of the file stored in the buffer; and
terminating, by one or more processors, an upload of a second portion of the file from the client device to the buffer of the server device based, at least in part, on receiving a stop message.

10. The computer program product according to claim 9, the computer-implemented method comprising:
determining that an execution of the predefined transformation will yield a content of the buffer; and
applying the predefined transformation to all of the existing data set.

11. The computer program product according to claim 10, the computer-implemented method comprising one or both of:
generating a progress message that indicates a status of the transformation that is being applied to the entire existing data set; and
upon determining that an inconsistency exists between the second portion of the file being uploaded to the buffer of the server device and a portion of a transformed existing file while being in the receiving mode, generating a difference message that indicates the inconsistency.

12. The computer program product according to claim 9, wherein the predefined transformation comprises executing at least one action selected out of a group of possible actions that include: a removal of a column, a renaming of a column, a reordering of columns, an insertion of a column, and a removal of an empty row.

13. The computer program product according to claim 9, the computer-implemented method comprising:
receiving a file upload request that includes meta data about a given file to be uploaded; and
using the meta data to identify a candidate existing file that, when transformed, may yield at least a portion of the given file to be uploaded.

14. The computer program product according to claim 9, the computer-implemented method comprising:
before reception of the data set, storing meta data of one or both of (i) a first portion of a complete file, wherein the first portion is stored in the buffer, and (ii) a related existing file generable by a transformation or an applied transformation.

15. The computer program product according to claim 9, the computer-implemented method comprising:
terminating, by the one or more processors, the receiving mode of the buffer automatically in response to a determination that the stop message was not received by the client device within a predetermined time period and that applying the predefined transformation to a predetermined percentage of a second portion of the existing data set stored on the server device continues to result in a set of data that corresponds to the second portion of the file already uploaded to the buffer of the server device.

16. A computer system, the computer system comprising:
one or more computer processors;
at least one computer readable storage medium that is not a transitory signal per se; and
program instructions stored on the at least one computer readable storage medium, the program instructions being executable by at least one computer processor of the one or more computer processors to cause the at least one computer processor to perform a computer-implemented method comprising:
uploading, by one or more processors, a first portion of a file from a client device to a buffer of a server device while a receiving mode of the buffer is active, wherein the first portion of the file is a predefined number of rows, a predefined volume of data, or a predefined number of records;
generating, by one or more processors, a transformation notification signal based, at least in part, on determining that applying a predefined transformation on a first portion of an existing data set stored on the server device results in a generation of a data set that corresponds to the first portion of the file stored in the buffer; and
terminating, by one or more processors, an upload of a second portion of the file from the client device to the buffer of the server device based, at least in part, on receiving a stop message.

* * * * *